US011720969B2

(12) United States Patent
Zhang et al.

(10) Patent No.: US 11,720,969 B2
(45) Date of Patent: Aug. 8, 2023

(54) DETECTING VEHICLE IDENTITY AND DAMAGE STATUS USING SINGLE VIDEO ANALYSIS

(71) Applicant: International Business Machines Corporation, Armonk, NY (US)

(72) Inventors: Hong Bing Zhang, Beijing (CN); Jing Wu, Xian (CN); Fan Li, Xianyang (CN); Dan Zhang, Beijing (CN); Yun Jing Zhao, Beijing (CN); Xue Ping Liu, Beijing (CN); Xin Fang Hao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 16/784,309

(22) Filed: Feb. 7, 2020

(65) Prior Publication Data

US 2021/0248681 A1    Aug. 12, 2021

(51) Int. Cl.
*G06Q 40/08* (2012.01)
*G06Q 30/02* (2023.01)
*G06T 7/00* (2017.01)
*G06Q 10/10* (2023.01)
*G06V 20/10* (2022.01)

(52) U.S. Cl.
CPC ............ *G06Q 40/08* (2013.01); *G06Q 10/10* (2013.01); *G06Q 30/0278* (2013.01); *G06T 7/0002* (2013.01); *G06V 20/10* (2022.01); *G06T 2207/10016* (2013.01); *G06T 2207/30168* (2013.01); *G06T 2207/30252* (2013.01); *G06V 2201/08* (2022.01)

(58) Field of Classification Search
CPC .... G06Q 40/08; G06Q 10/10; G06Q 30/0278; G06V 20/10; G06V 2201/08; G06T 7/0002; G06T 2207/10016; G06T 2207/30168; G06T 2207/30252
USPC ....................................... 705/3–44; 706/3–44
See application file for complete search history.

(56) References Cited

U.S. PATENT DOCUMENTS

| | | | |
|---|---|---|---|
| 7,791,501 B2 | 9/2010 | Ioli | |
| 10,373,260 B1 * | 8/2019 | Haller, Jr. | ............ G06V 10/751 |
| 10,733,160 B1 * | 8/2020 | Leise | ..................... G06Q 40/08 |
| 10,803,527 B1 * | 10/2020 | Zankat | ................... G06V 20/59 |
| 10,814,800 B1 * | 10/2020 | Gould | ................. B60R 25/1004 |

(Continued)

FOREIGN PATENT DOCUMENTS

CN    101303761 A    11/2008
WO    WO-2004042673 A2 *    5/2004    ......... G06K 9/00785

OTHER PUBLICATIONS

Li et al., "An anti-fraud system for Car Insurance claim based on visual evidence", CSV, (Apr. 2018).*

(Continued)

*Primary Examiner* — Frantzy Poinvil
(74) *Attorney, Agent, or Firm* — Edward J. Wixted, III (57) ABSTRACT

In an approach for detecting vehicle identity and analyzing damage status using a single video, a processor provides an instruction for taking a video of a vehicle for a damage evaluation. A processor receives the video of the vehicle for the damage evaluation. A processor verifies the vehicle in the video being the same vehicle for the damage evaluation. A processor evaluates a damage status of the vehicle. A processor outputs a damage report based on the damage status of the vehicle.

17 Claims, 3 Drawing Sheets

(56) References Cited

U.S. PATENT DOCUMENTS

| | | | | |
|---|---|---|---|---|
| 2007/0086624 | A1* | 4/2007 | Breed | B60R 21/01552 |
| | | | | 382/104 |
| 2008/0051957 | A1* | 2/2008 | Breed | G06V 20/593 |
| | | | | 701/36 |
| 2015/0178595 | A1* | 6/2015 | Sawada | G06T 7/571 |
| | | | | 382/195 |
| 2016/0100160 | A1* | 4/2016 | Tsai | G06T 5/003 |
| | | | | 348/187 |
| 2017/0372465 | A1* | 12/2017 | Forutanpour | G06V 10/42 |
| 2018/0082379 | A1* | 3/2018 | Kelsh | G06Q 40/08 |
| 2018/0260793 | A1* | 9/2018 | Li | G06Q 40/08 |
| 2019/0073641 | A1 | 3/2019 | Utke | |
| 2019/0095877 | A1 | 3/2019 | Li | |
| 2019/0114717 | A1* | 4/2019 | Labrie | G06V 20/17 |
| 2019/0213804 | A1 | 7/2019 | Zhang et al. | |
| 2020/0090321 | A1* | 3/2020 | Xu | G06Q 10/10 |
| 2020/0402178 | A1* | 12/2020 | Brandmaier | H04N 5/232933 |
| 2021/0034879 | A1* | 2/2021 | Chenillo | G06F 16/435 |

OTHER PUBLICATIONS

Jayawardena, Srimal, "Image Based Automatic Vehicle Damage Detection", A Thesis submitted for the degree of Doctor of Philosophy at The Australian National University, Nov. 2013, 199 pages <https://www.researchgate.net/profile/Srimal_Jayawardena/publication/263619076_Image_Based_Automatic_Vehicle_Damage_Detection/links/0f31753b6137b19d42000000/Image-Based-Automatic-Vehicle-Damage-Detection.pdf>.

* cited by examiner

DETECTING VEHICLE IDENTITY AND DAMAGE STATUS USING SINGLE VIDEO ANALYSIS

BACKGROUND

The present disclosure relates generally to the field of video recognition, and more particularly to detecting vehicle identity and analyzing damage status using a single video.

When a traffic accident occurs, it is often necessary to wait for a claim adjuster for an insurance company to go to the accident scene to process and acquire a claims basis by photographing, etc. With the increase in motor vehicle ownership in recent years, the number of annual traffic accidents has been at a high level. However, vehicle loss assessment claims service processing often depends on human on-scene processing of professional insurance staff, which may feature high costs, a long waiting period, and low processing efficiency.

SUMMARY

Aspects of an embodiment of the present disclosure disclose an approach for detecting vehicle identity and analyzing damage status using a single video. A processor provides an instruction for taking a video of a vehicle for a damage evaluation. A processor receives the video of the vehicle for the damage evaluation. A processor verifies the vehicle in the video being the same vehicle for the damage evaluation. A processor evaluates a damage status of the vehicle. A processor outputs a damage report based on the damage status of the vehicle.

DETAILED DESCRIPTION

The present disclosure is directed to systems and methods for detecting vehicle identity and analyzing damage status using a single video.

Automatically detecting vehicle damage using photographs or videos taken at the accident scene is very useful as it can greatly reduce the cost of processing insurance claims, as well as provide greater convenience for vehicle users. An ideal scenario would be where the vehicle user can upload a few photographs or videos of the damaged car taken from a mobile phone and have the damage assessment and insurance claim processing done automatically. However, such a solution remains a challenging task how to make sure the photos or videos taken are from and for a same vehicle. Embodiments of the present application recognize a need to verify the video integrity for the damage evaluation and verify the vehicle in the video being the same vehicle for the damage evaluation. Embodiments of the present application use one video clip to identify the vehicle identity and automatically analyze the vehicle damage status via video analytics technology. In the application scenario of the embodiments, the vehicle owner user can take one single video for a damaged vehicle part and an entire vehicle by using a mobile terminal (for example, a mobile phone) at a traffic accident scene. The vehicle owner user can take the single video including a vehicle identification number, a vehicle license, a user identity, etc.

Figure 1:
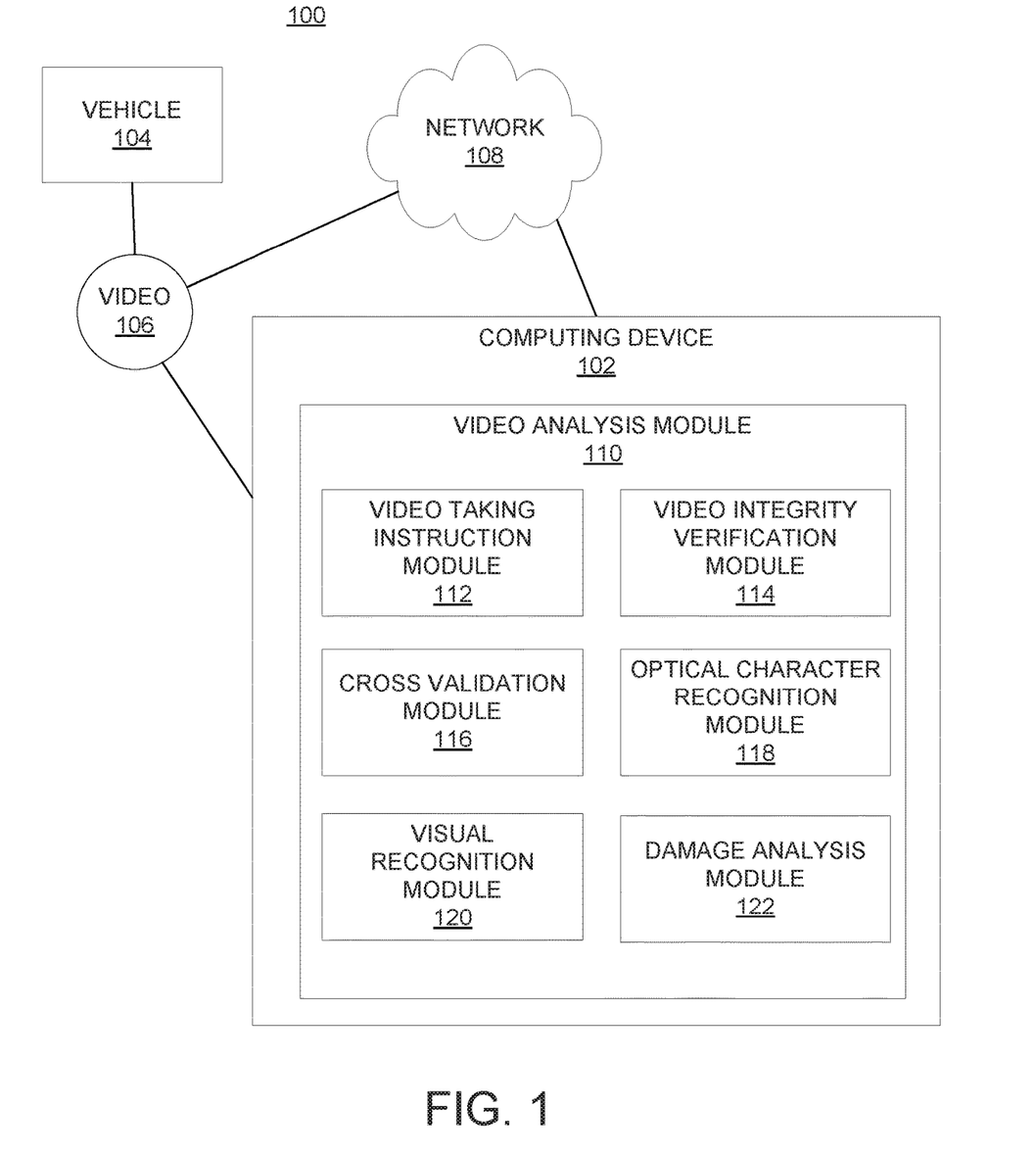
FIG. 1 is a functional block diagram illustrating a vehicle video verification and damage analysis environment, in accordance with an embodiment of the present disclosure.

The present disclosure will now be described in detail with reference to the Figures. FIG. 1 is a functional block diagram illustrating a vehicle video verification and damage analysis environment, generally designated 100, in accordance with an embodiment of the present disclosure.

In the depicted embodiment, vehicle video verification and damage analysis environment 100 includes computing device 102, vehicle 104, video 106, and network 108. Vehicle 104 is a subject to be inspected and evaluated for damages. For example, vehicle 104 may be a car, truck, motorcycle, train, plane, or any other transportation tool that is involved in an accident or other similar situation for damage evaluation for an insurance claim. Video 106 is taken by a user on vehicle 104 for damage evaluation, for example, when an accident happens. Video 106 may be taken by the vehicle owner in the scene. Video 106 may be taken by the user following instructions given by computing device 102. Video 106 can be taken as a single video clip. In the depicted embodiment, video 106 can be accessed through network 108 or directly by computing device 102.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to video analysis module 110 and network 108 and is capable of processing program instructions and executing video analysis module 110, in accordance with an embodiment of the present disclosure. Computing device 102 may include internal and external hardware components, as depicted and described in further detail with respect to FIG. 3.

Further, in the depicted embodiment, computing device 102 includes video analysis module 110. In the depicted embodiment, video analysis module 110 is located on computing device 102. However, in other embodiments, video analysis module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and video analysis module 110, in accordance with a desired embodiment of the disclosure.

In the depicted embodiment, video analysis module 110 includes video taking instruction module 112, video integrity verification module 114, cross validation module 116, optical character recognition module 118, visual recognition module 120, and damage analysis module 122.

In one or more embodiments, video taking instruction module 112 is configured to provide an instruction for a user to take a video of a vehicle for damage evaluation. Video taking instruction module 112 may instruct the user to take the video continuously without an interruption and smoothly without a sudden movement. Video taking instruction module 112 may instruct the user to take the video without stopping so the video can be a single video clip. Video taking instruction module 112 may instruct the user to capture surroundings of the vehicle, damaged portions, and the identification of the vehicle. For example, video taking instruction module 112 may instruct the user to take the video inside and outside the vehicle. Video taking instruction module 112 may instruct the user to take the video on any damage area in the vehicle. Video taking instruction module 112 may instruct the user to take the video on the dashboard including the mileage information. Video taking instruction module 112 may instruct the user to take the video on the portion with a vehicle identification number and or other identification information such as a plate number and registration card on the vehicle.

In one or more embodiments, video integrity verification module 114 is configured to verify the vehicle in the video being the same vehicle for the damage evaluation. Video integrity verification module 114 may verify the video integrity for the damage evaluation of the video. In an example, video integrity verification module 114 may detect if there is blurriness in each frame of the video using Laplacian variance techniques. Video integrity verification module 114 can determine whether each image of the video is blurred or not, and what is the extent of blur through variance of Laplacian. If video integrity verification module 114 detects blurriness in frames of the video, video integrity verification module 114 may reject the video and give a warning or alert to the user. In another example, video integrity verification module 114 may use a video optical flow consistency analysis method to find whether the video contains abrupt changing frames. In general, a steady video has a fluent changing of the optical flow. If the video is manipulated, there can be abrupt changing among a previous frame, current frame, and next frame in the video. Video integrity verification module 114 may detect whether there is abrupt frame changing of the video by analyzing a change of the corresponding pixels between previous frame and current frame in the video. If video integrity verification module 114 detects an abrupt frame changing of the video, video integrity verification module 114 may reject the video and give a warning or alert to the user. In another example, video integrity verification module 114 may use object tracking and object detection to confirm no change from one vehicle to another vehicle during the video recording. Video integrity verification module 114 may recognize a vehicle in the video first and then track the vehicle. If a tracking bounding box is lost or there are multiple bounding boxes found in the video, video integrity verification module 114 may determine that the video is likely to include some abnormal actions. In response to recognizing the vehicle being not the same vehicle for the damage evaluation, video integrity verification module 114 may give a warning or alert to the user.

In one or more embodiments, cross validation module 116 is configured to perform a cross validation of the vehicle. The cross validation may include checking appearance time of the vehicle in public video records. For example, cross validation module 116 may check timestamp of the video and use an engineering way to get the clock time of the video. The time clock can be cross verified via checking the vehicle's appearance time in the public camera records. For example, when the vehicle appears in a public camera record, cross validation module 116 may get the timestamp of the public camera record and may verify the time of the vehicle in the video.

In one or more embodiments, optical character recognition module 118 is configured to recognize the vehicle identification number and the dashboard mileage information in the video. In general, optical character recognition is the use of technology to distinguish printed or handwritten text characters inside digital images of physical documents, such as a scanned paper document. The basic process of optical character recognition involves examining the text of a document and translating the characters into code that can be used for data processing. Optical character recognition module 118 may identify the letters and numbers displayed on the dashboard, including the mileage indicated by the odometer. Optical character recognition module 118 may identify the vehicle identification number or other identification information of the vehicle.

In one or more embodiments, visual recognition module 120 is configured to recognize if there is any damage of the vehicle in the video. In an example, visual recognition module 120 may use deep learning algorithms to analyze images of the video of the vehicle for identifying damaged portions of the vehicle.

In one or more embodiments, damage analysis module 122 is configured to evaluate a damage status of the vehicle. Damage analysis module 122 may output a damage report based on the damage status of the vehicle. Damage analysis module 122 may perform video analysis to determine frames of the video that include a damaged portion of the vehicle. Damage analysis module 122 may analyze the frames of the video that include a damaged portion of the vehicle to determine a damaged cluster of parts of the vehicle. Damage analysis module 122 may determine whether the damaged cluster of parts should be repaired or replaced. Damage analysis module 122 may map the damaged cluster of parts to one or more parts in a vehicle-specific database of parts, and generate, based on the mapping, a list of parts for repair or replacement.

Figure 2:
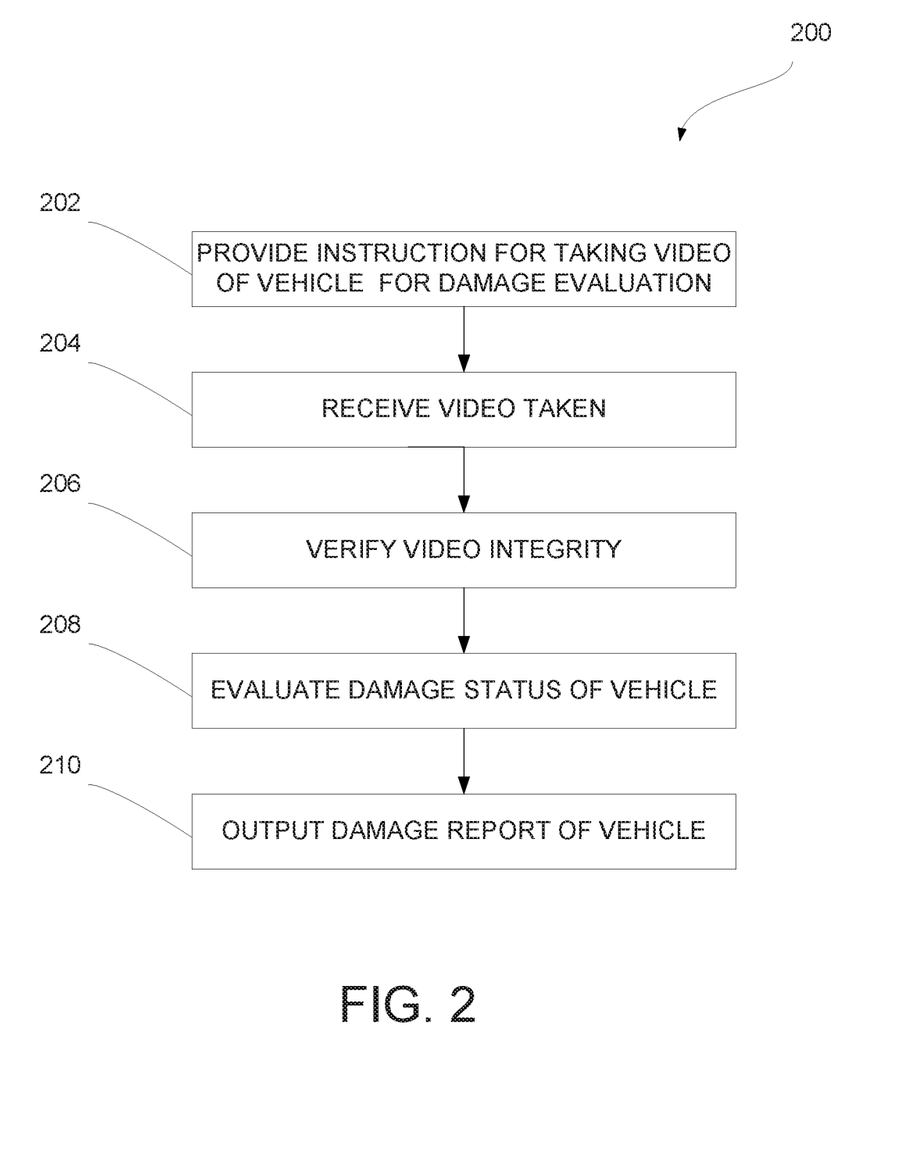
FIG. 2 is a flowchart depicting operational steps of a video analysis module within a computing device of FIG. 1, in accordance with an embodiment of the present disclosure.

FIG. 2 is a flowchart 200 depicting operational steps of video analysis module 110 in accordance with an embodiment of the present disclosure.

Video analysis module 110 operates to provide an instruction for taking a video of a vehicle for a damage evaluation. Video analysis module 110 operates to receive the video of the vehicle for the damage evaluation. Video analysis module 110 also operates to verify the vehicle in the video being the same vehicle for the damage evaluation. Video analysis module 110 operates to evaluate a damage status of the vehicle. Video analysis module 110 operates to output a damage report based on the damage status of the vehicle.

In step 202, video analysis module 110 provides an instruction for a user to take a video of a vehicle for a damage evaluation. Video analysis module 110 may provide the instruction via video taking instruction module 112. For example, the instruction can be a demo video to show how a user should take the video on a vehicle. The instruction may be in a documentation to instruct the user. The instruction can be an audio to tell the user how to take a video on a vehicle. The instruction can be in some other media format or application for the user to learn. Video taking instruction module 112 may instruct the user to take the video continuously without an interruption and smoothly without a sudden movement. Video taking instruction module 112 may instruct the user to take the video without stopping so the video can be a single video clip. Video taking instruction module 112 may instruct the user to capture surroundings of the vehicle, damaged portions, and identification of the vehicle. For example, video taking instruction module 112 may instruct the user to take the video inside and outside the vehicle. Video taking instruction module 112 may instruct the user to take the video on any damage area in the vehicle. Video taking instruction module 112 may instruct the user to take the video on the dashboard including mileage information. Video taking instruction module 112 may instruct the user to take the video on the portion with a vehicle identification number and or other identification information such as the plate number and registration card on the vehicle.

In step 204, video analysis module 110 receives the video of the vehicle for the damage evaluation. The video of the vehicle is taken by the user following an instruction provided via video taking instruction module 112.

In step 206, video analysis module 110 verifies the video integrity for the damage evaluation of the video. Video analysis module 110 verifies the vehicle in the video being the same vehicle for the damage evaluation. Video integrity verification module 114 may verify the video integrity via video integrity verification module 114. In an example, video integrity verification module 114 may detect if there is blurriness in each frame of the video using Laplacian variance techniques. Video integrity verification module 114 can determine whether each image of the video is blurred or not, and what is the extent of blur through variance of Laplacian. If video integrity verification module 114 detects blurriness over a threshold in frames of the video, video integrity verification module 114 may reject the video and give a warning or alert to the user. In another example, video integrity verification module 114 may use a video optical flow consistency analysis method to find whether the video contains abrupt changing frames. In general, a steady video has a fluent changing of the optical flow. If the video is manipulated, there can be abrupt changing among a previous frame, current frame, and next frame in the video. Video integrity verification module 114 may detect whether there is abrupt frame changing of the video by analyzing a change of the corresponding pixels between previous frame and current frame in the video. If video integrity verification module 114 detects an abrupt frame changing of the video, video integrity verification module 114 may reject the video and give a warning or alert to the user. In another example, video integrity verification module 114 may use object tracking and object detection to confirm no change from one vehicle to another vehicle during the video recording. Video integrity verification module 114 may recognize a vehicle in the video first and then track the vehicle. If a tracking bounding box is lost or there are multiple bounding boxes found in the video, video integrity verification module 114 may determine that the video is likely to include some abnormal actions. In response to recognizing the vehicle being not the same vehicle for the damage evaluation, video integrity verification module 114 may give a warning or alert to the user.

In step 208, video analysis module 110 evaluates a damage status of the vehicle in the video. Video analysis module 110 may evaluate the damage status of the vehicle via damage analysis module 122. For example, damage analysis module 122 may perform video analysis to determine frames of the video that include a damaged portion of the vehicle. Damage analysis module 122 may analyze the frames of the video that include a damaged portion of the vehicle to determine a damaged cluster of parts of the vehicle. Damage analysis module 122 may determine whether the damaged cluster of parts should be repaired or replaced. Damage analysis module 122 may map the damaged cluster of parts to one or more parts in a vehicle-specific database of parts, and generate, based on the mapping, a list of parts for repair or replacement. In step 210, video analysis module 110 outputs a damage report based on the damage status of the vehicle. Video analysis module 110 may output the damage report based on the damage status of the vehicle via damage analysis module 122.

Figure 3:
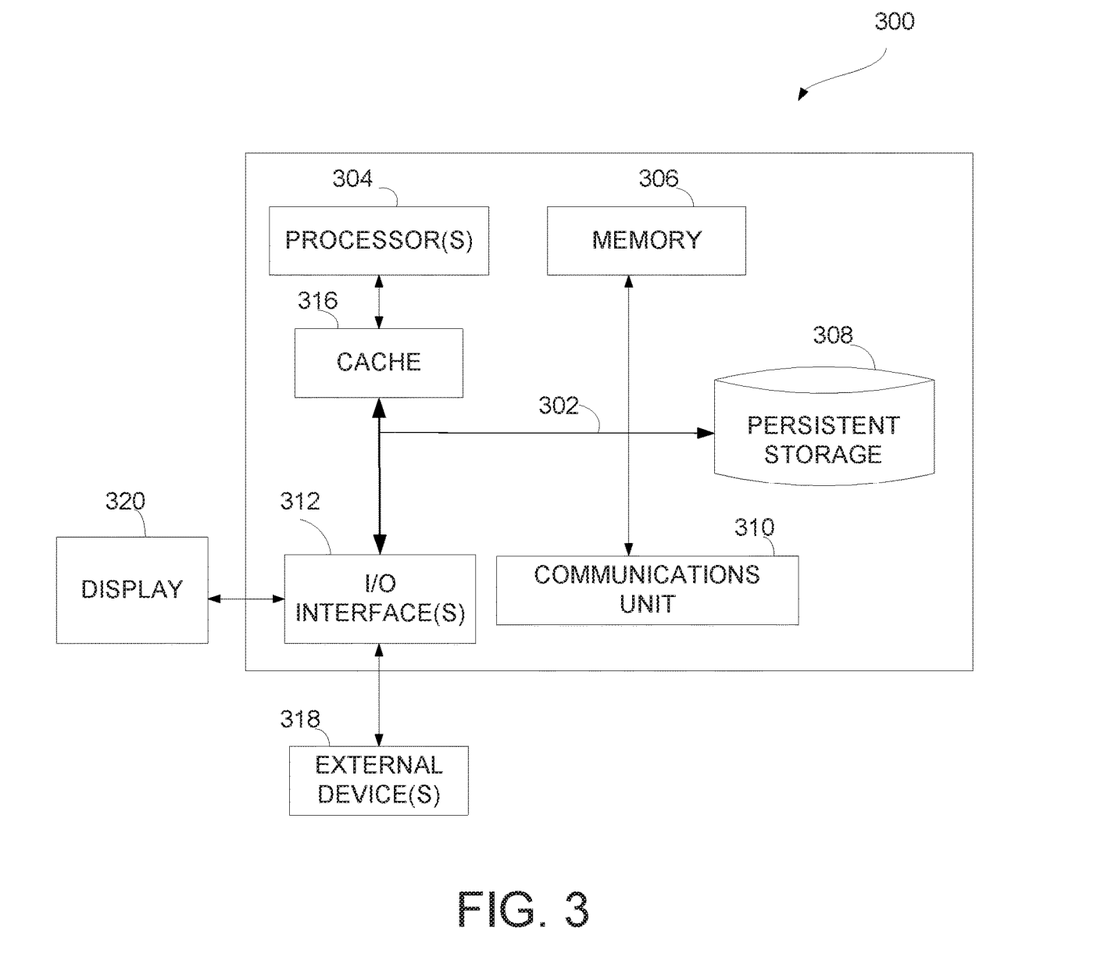
FIG. 3 is a block diagram of components of the computing device of FIG. 1, in accordance with an embodiment of the present disclosure.

FIG. 3 depicts a block diagram 300 of components of computing device 102 in accordance with an illustrative embodiment of the present disclosure. It should be appreciated that FIG. 3 provides only an illustration of one implementation and does not imply any limitations with regard to the environments in which different embodiments may be implemented. Many modifications to the depicted environment may be made.

Computing device 102 may include communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Video analysis module 110 may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Video analysis module 110 may be downloaded to persistent storage 308 through communications unit 310.

I/O interface(s) 312 allows for input and output of data with other devices that may be connected to computing device 102. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., video analysis module 110 can be stored on such portable computer readable storage media and can be loaded onto persistent storage 308 via I/O interface(s) 312. I/O interface(s) 312 also connect to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   providing, by one or more processors, an instruction for taking a video of a vehicle for a damage evaluation;
   receiving, by one or more processors, the video of the vehicle for the damage evaluation;
   verifying, by one or more processors, the vehicle in the video being the same vehicle for the damage evaluation, wherein verifying the vehicle includes:
     detecting blurriness and extent of the blurriness in a frame of the video,
     detecting an existing abrupt frame change of the video by analyzing a change of corresponding pixels between previous frame and current frame in the video with a video optical flow consistency analysis method, and
     performing a cross validation, the cross validation including checking appearance time of the vehicle in public video records by checking timestamp of the video and verifying the time of the vehicle in the video;
   evaluating, by one or more processors, a damage status of the vehicle based on an analysis of the video; and
   outputting, by one or more processors, a damage report based on the damage status of the vehicle.

2. The computer-implemented method of claim 1, wherein providing the instruction includes instructing a user to take the video continuously without an interruption and smoothly without a sudden movement, and to capture surroundings, damaged portions, and identification of the vehicle in the video.

3. The computer-implemented method of claim 1, wherein verifying the vehicle includes:
   detecting blurriness in each frame of the video using Laplacian variance techniques, and
   detecting any existing abrupt frame changing of the video by analyzing a change of corresponding pixels between previous frame and current frame in the video.

4. The computer-implemented method of claim 1, wherein verifying the vehicle includes:
   in response to recognizing the vehicle being not the same vehicle for the damage evaluation, giving an alert to a user.

5. The computer-implemented method of claim 1, wherein evaluating the damage status includes detecting an identification of the vehicle using optical character recognition techniques.

6. The computer-implemented method of claim 1, wherein evaluating the damage status includes detecting damages of the vehicle using visual recognition techniques.

7. A computer program product comprising:
   a computer readable storage medium having program instructions embodied therewith, the program instructions executable by a processor to cause, the processor to:
   provide, by the processor, an instruction for taking a video of a vehicle for a damage evaluation;
   receive, by the processor, the video of the vehicle for the damage evaluation;
   verify, by the processor, the vehicle in the video being the same vehicle for the damage evaluation, wherein verifying the vehicle includes:
     detecting blurriness and extent of the blurriness in a frame of the video,
     detecting an existing abrupt frame change of the video by analyzing a change of corresponding pixels between previous frame and current frame in the video with a video optical flow consistency analysis method, and
     performing a cross validation, the cross validation including checking appearance time of the vehicle in public video records by checking timestamp of the video and verifying the time of the vehicle in the video;
   evaluate, by the processor, a damage status of the vehicle based on an analysis of the video; and
   output, by the processor, a damage report based on the damage status of the vehicle.

8. The computer program product of claim 7, wherein providing the instruction instructing a user to take the video continuously without an interruption and smoothly without a sudden movement, and to capture surroundings, damaged portions, and identification of the vehicle in the video.

9. The computer program product of claim 7, wherein verifying the vehicle includes:
   detecting blurriness in each frame of the video using Laplacian variance techniques, and
   detecting any existing abrupt frame changing of the video by analyzing a change of corresponding pixels between previous frame and current frame in the video.

10. The computer program product of claim 7, wherein verifying the vehicle includes, in response to recognizing the vehicle being not the same vehicle for the damage evaluation, giving an alert to a user.

11. The computer program product of claim 7, wherein evaluating the damage status includes detecting an identification of the vehicle using optical character recognition techniques.

12. The computer program product of claim 7, wherein evaluating the damage status includes detecting damages of the vehicle using visual recognition techniques.

13. A computer system comprising:
one or more computer processors, one or more computer readable storage media, and program instructions stored on the one or more computer readable storage media for execution by at least one of the one or more computer processors, the program instructions comprising:
program instructions to provide an instruction for taking a video of a vehicle for a damage evaluation;
program instructions to receive the video of the vehicle for the damage evaluation;
program instructions to verify the vehicle in the video being the same vehicle for the damage evaluation, wherein program instructions to verify the vehicle include:
    program instructions to detect blurriness and extent of the blurriness in a frame of the video,
    program instructions to detect an existing abrupt frame change of the video by analyzing a change of corresponding pixels between previous frame and current frame in the video with a video optical flow consistency analysis method, and
    program instructions to perform a cross validation, the cross validation including checking appearance time of the vehicle in public video records by checking timestamp of the video and verifying the time of the vehicle in the video;
program instructions to evaluate a damage status of the vehicle based on an analysis of the video; and
program instructions to output a damage report based on the damage status of the vehicle.

14. The computer system of claim 13, wherein program instructions to provide the instruction include program instructions to instruct a user to take the video continuously without an interruption and smoothly without a sudden movement, and to capture surroundings, damaged portions, and identification of the vehicle in the video.

15. The computer system of claim 13, wherein program instructions to verify the vehicle include:
    program instructions to detect blurriness in each frame of the video using Laplacian variance techniques, and
    program instructions to detect any existing abrupt frame changing of the video by analyzing a change of corresponding pixels between previous frame and current frame in the video.

16. The computer system of claim 13, wherein program instructions to verify the vehicle include, in response to recognizing the vehicle being not the same vehicle for the damage evaluation, program instructions to give a warning or alert to a user.

17. The computer system of claim 13, wherein program instructions to evaluate the damage status include program instructions to detect an identification of the vehicle using optical character recognition techniques.

* * * * *